Aug. 22, 1961  F. A. WOJCIK  2,997,537
CUBICAL VISION MOTION PICTURE APPARATUS
Filed Jan. 8, 1957  7 Sheets-Sheet 1

INVENTOR.
Frank A. Wojcik

Aug. 22, 1961  F. A. WOJCIK  2,997,537
CUBICAL VISION MOTION PICTURE APPARATUS
Filed Jan. 8, 1957  7 Sheets-Sheet 2

INVENTOR.
Frank A. Wojcik

*INVENTOR.*
Frank A. Wojcik

Aug. 22, 1961     F. A. WOJCIK     2,997,537
CUBICAL VISION MOTION PICTURE APPARATUS

Filed Jan. 8, 1957     7 Sheets-Sheet 4

*INVENTOR.*
Frank A. Wojcik

Aug. 22, 1961  F. A. WOJCIK  2,997,537
CUBICAL VISION MOTION PICTURE APPARATUS
Filed Jan. 8, 1957  7 Sheets-Sheet 5

INVENTOR.
Frank A. Wojcik

INVENTOR.
Frank A. Wojcik

United States Patent Office 2,997,537
Patented Aug. 22, 1961

2,997,537
CUBICAL VISION MOTION PICTURE APPARATUS
Frank A. Wojcik, 5417 E. 17th St., Indianapolis 18, Ind.
Filed Jan. 8, 1957, Ser. No. 634,009
3 Claims. (Cl. 178—7.2)

My invention relates to motion picture apparatus and more particularly to cubical vision motion picture apparatus consisting of two separately located and synchronized peripheral motion picture camera projectors, one of which is mounted on a horizontal plane and the other is mounted on a vertical plane. The horizontal camera sweeps a three hundred and sixty degree angle of view of its surrounding region and simultaneously projects a three hundred and sixty degree orthographic image, consisting of four directions, north, east, south and west, or front, right side, rear and left side, directly onto the photo-sensitive surface of a television camera tube. During the same time the vertical camera sweeps a three hundred and sixty degree angle of view of its surrounding region and simultaneously projects degree orthographic image, consisting of four directions, top, directly onto the photo-sensitive surface of another television camera tube.

The electronic signals from the horizontal and vertical television camera tubes are utilized to form a montage comprising an undistorted orthographic television picture of the enveloping region consisting of the six, ninety degree by ninety degree views arranged in a preferred pattern.

A search of the prior arts failed to disclose an apparatus such as my cubical vision motion picture camera projector. My invention is the nearest solution to the "all seeing eye" that is indispensable in a perfect remote control guiding system for intercontinental aircraft, guided missiles, rockets, man made sattelites, space ships, submarines etc.

Broadly it is the object of my invention to provide a sweeping and projecting instrument which when directed at the enveloping region will simultaneously obtain and transmit an accurate representation of scenes and objects of the enveloping region onto a screen as one orthographic motion picture, composed of six ninety degree by ninety degree views, left side, front, right side, rear, top and bottom.

It is further the object of my invention to provide a sweeping and projecting instrument which when directed at the encircling region will simultaneously obtain and transmit an accurate representation of scenes and objects of the encircling region onto a screen as one orthographic motion picture composed of four views, left side, front, right side, and rear.

Another object is to provide a means within my apparatus for converting the three hundred and sixty degree angle of view to a pictorial opposite direction calculator whereby a position or direction on the viewing screen will be located directly above or below the opposite position or direction, in other words the angular relation of one position or direction to the opposite position or direction is always one hundred and eighty degrees.

Still another object is to incorporate in my invention a means of controlling the relative lateral position of the motion picture shown on the viewing screen at will, either manually or automatically.

In addition it is the object of my invention to incorporate my cubical vision principle with radar systems.

Still a further object is to utilize the relative position of the objects and scenes on the viewing screen in conjunction with a three hundred and sixty degree adjustable picture mask or scale and an artificial horizon as a means for indicating the relative direction of the craft at all times, the result of this feature is a pictorial sextant.

It is also the object of my invention to provide cubical vision in television.

The above and other objects of this invention will become apparent and readily understood by reference to the following specification when read in connection with the drawings in which the elements of the system whose details do not themselves form a part of the invention, and which are well known to those skilled in the arts, have been shown only diagrammatically. Reference is now made to the accompanying drawings wherein similar reference characters designate similar elements and wherein:

FIGURE 1 also shows the path on which a light ray travels in passing through the optical system.

FIGURES 2A and 2B are exploded perspective views of a combination opposite angle mirror-wheel and a standard mirror-wheel.

Figure 4A:
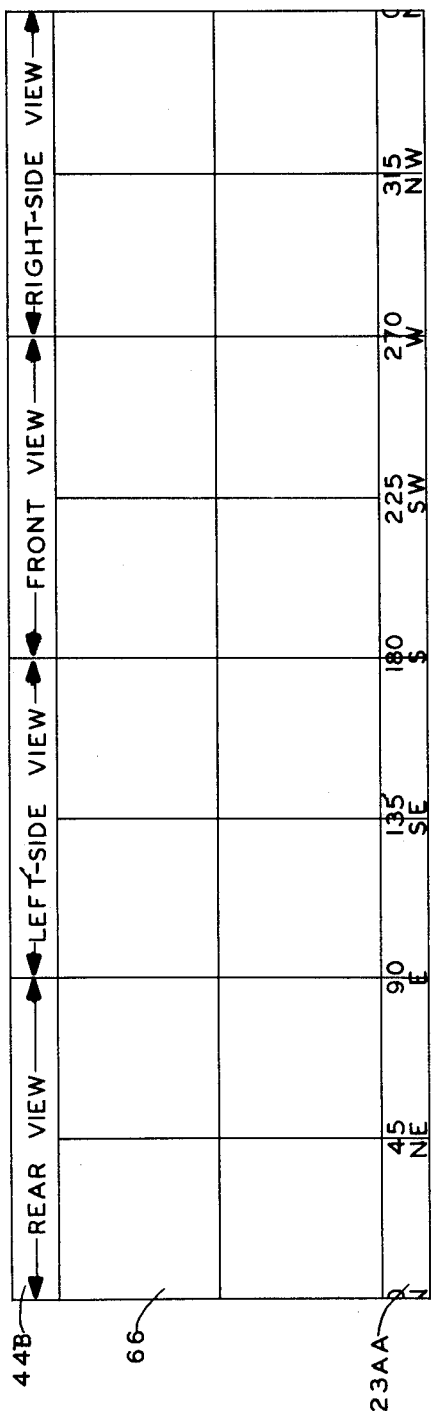

FIGURE 4A diagram shows the angular extent and the aspect ratio of the, laterally adjusted, horizontal camera projector three hundred and sixty degree orthographic image, divided into four views, rear, left, front, and right, the images of the view scale and the adjustable azimuth scale are also included.

Figure 4B:
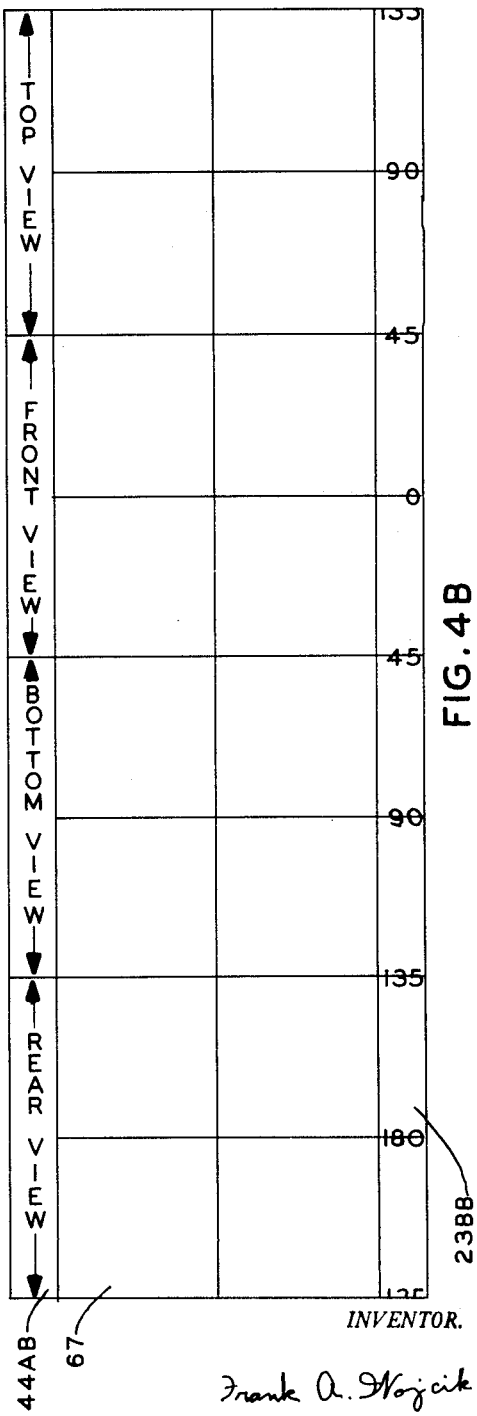

FIGURE 4B diagram shows the corresponding angular extent and the aspect ratio of the vertical camera projector three hundred and sixty degree orthographic image divided into four views as it would appear on the viewing screen before blanking, included are the images of the view scale and the craft attitude scale.

Figure 4C:
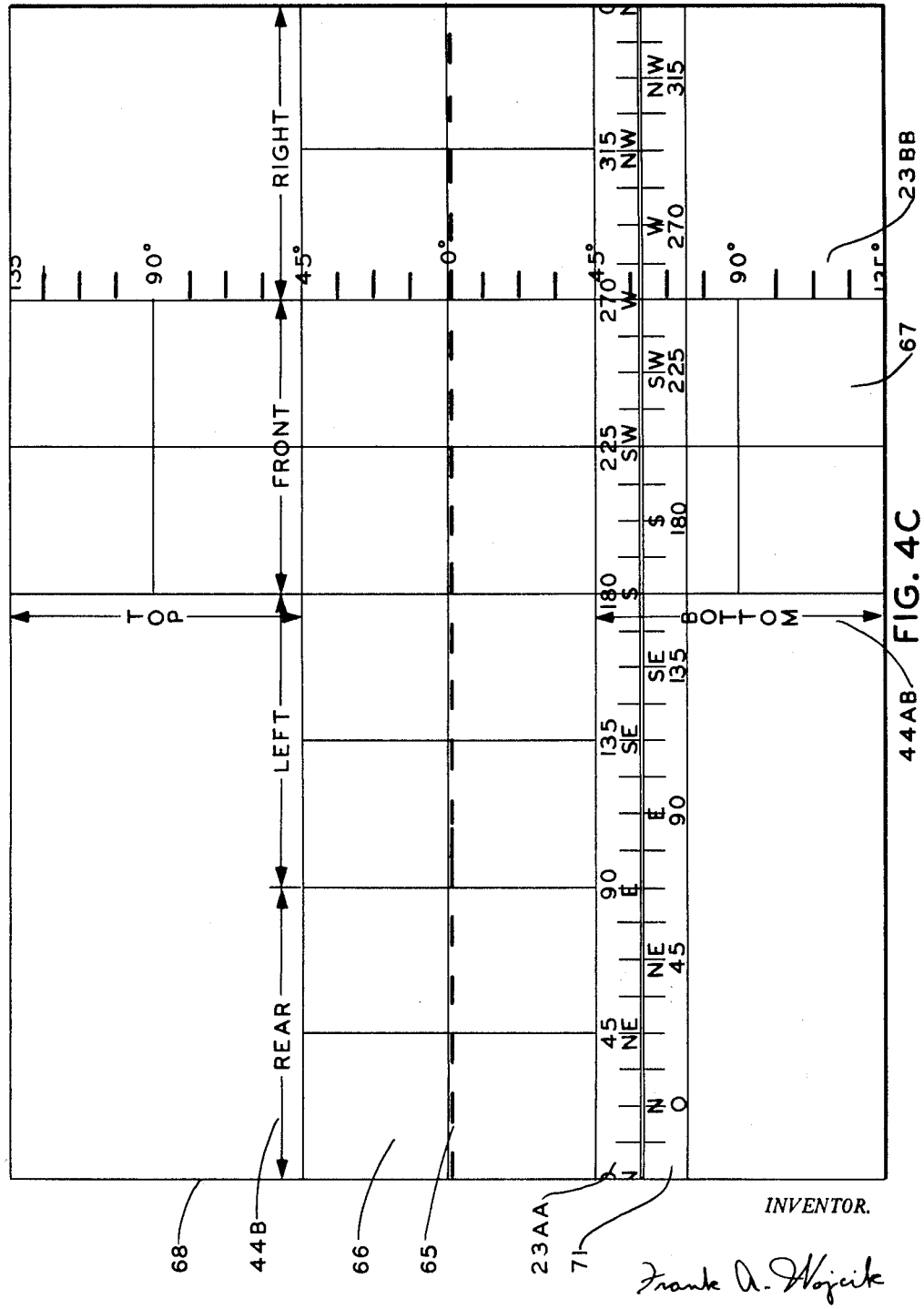

FIGURE 4C is a composite diagram of FIGURE 4A and 4B blanked, also shown is one arrangement of the six required orthographic views that make up a picture of cubical vision, it is shown here as superimposed on a 4:3 television picture screen also shown is a superimposed image of the artificial horizon and the craft course gyro scale.

Figure 5A:
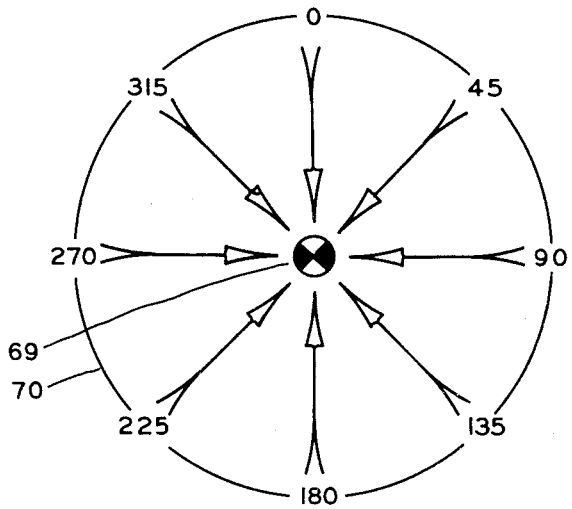

FIGURE 5A diagram shows the location of a peripheral motion picture camera projector in relation to opposite direction.

Figure 5B:
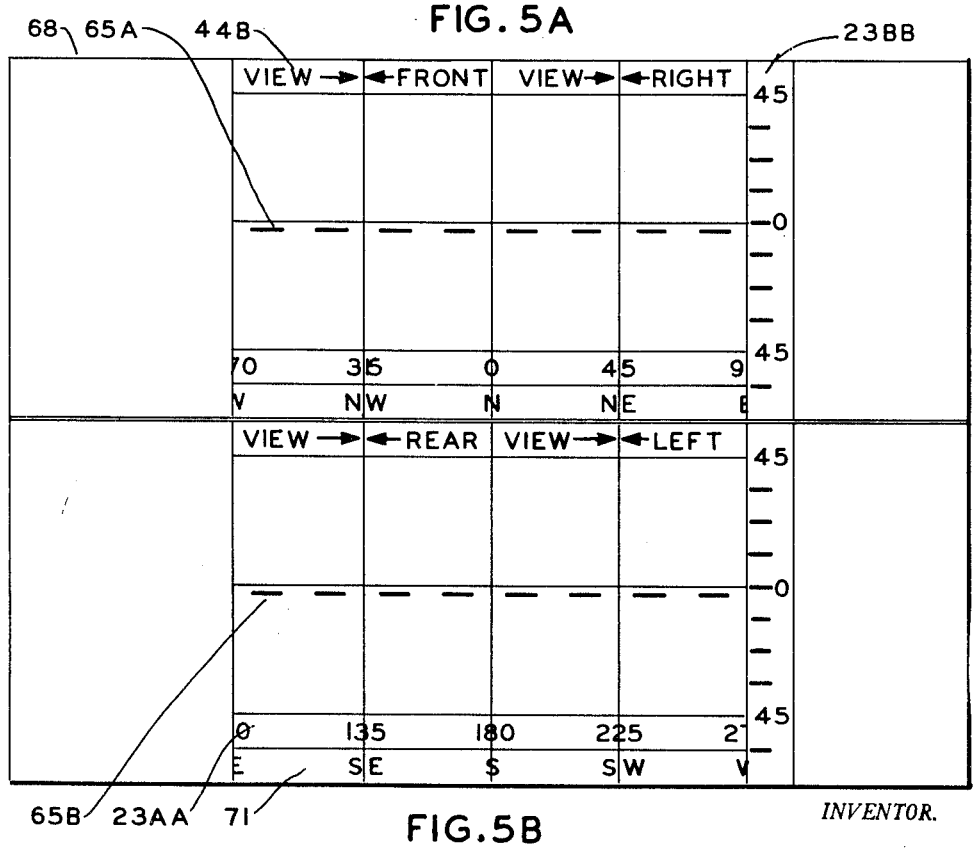

FIGURE 5B diagram shows the relation of opposite directions as they appear on a 4:3 television picture viewing screen.

Figure 6A:
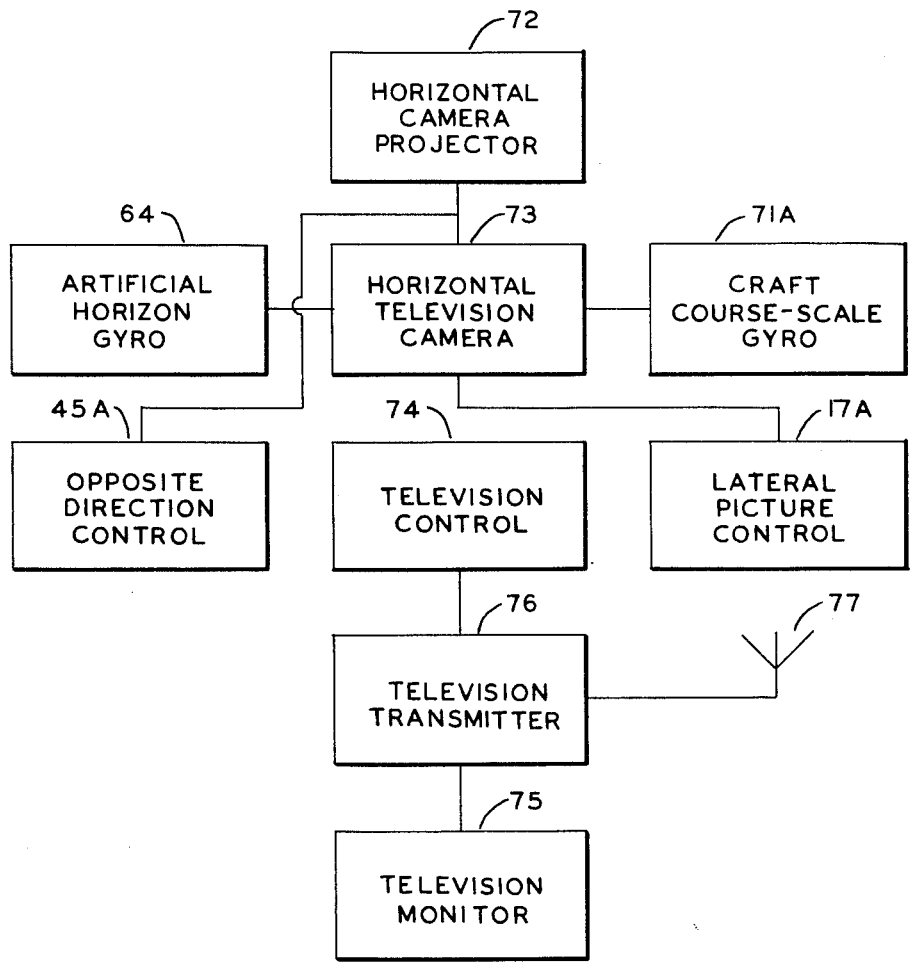

FIGURE 6A is a block diagram of one embodiment of my invention including one camera.

Figure 6B:
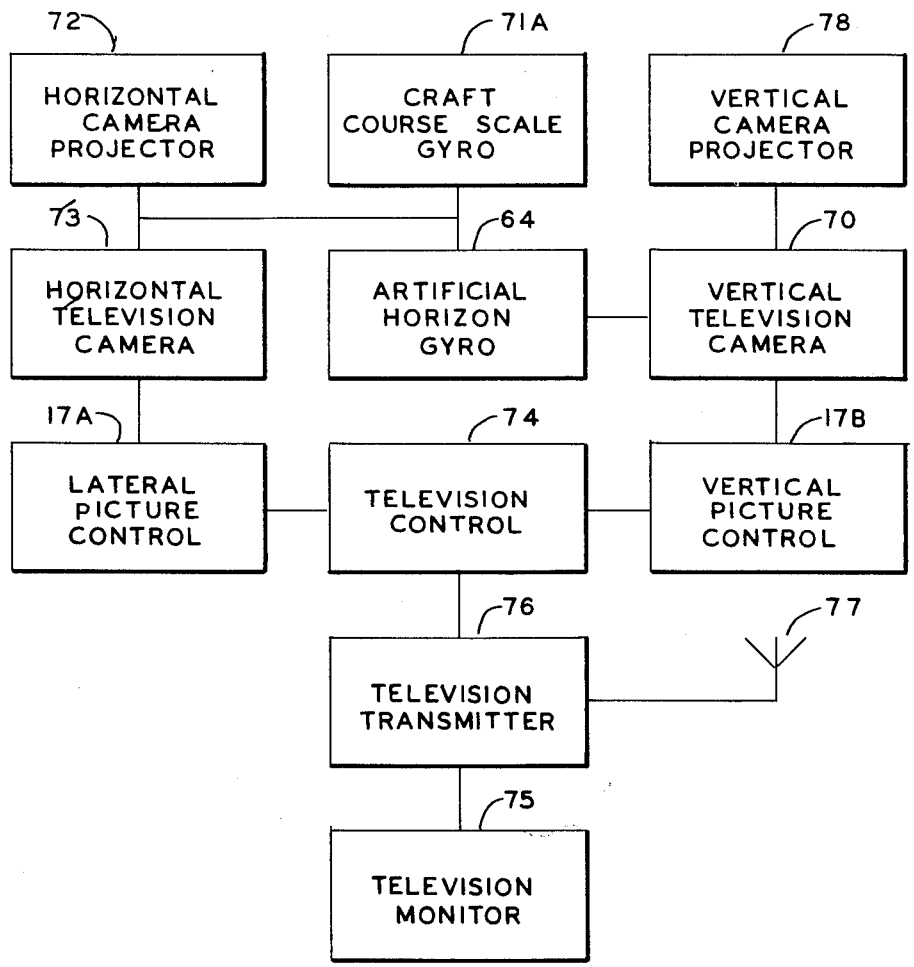

FIGURE 6B is another embodiment of my invention including two cameras in a ninety degree relation.

Figure 1:
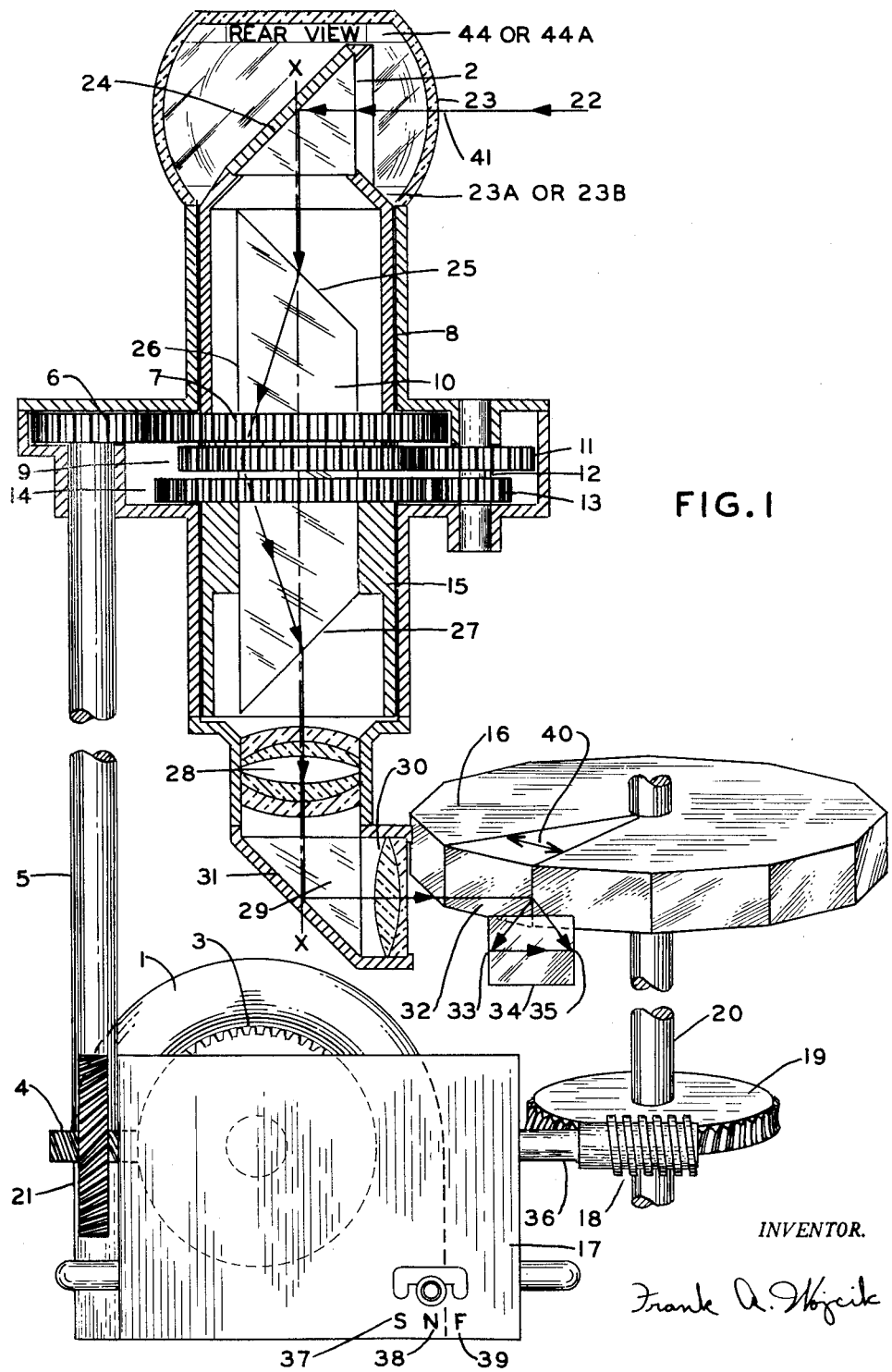
FIGURE 1 is a view partially in section illustrating the construction of the laboratory model of my peripheral motion picture camera projector.

Referring to FIGURE 1 numeral 1 indicates a constant speed motor, as the source of power, driving a right-angle prism 2 at approximately one thousand eight hundred revolutions per minute on axis $x$—$x$ that coincides with the vertical half of optical axis approximately one thousand eight hundred revolutions per minute on axis $x$—$x$ which coincides with the vertical portion of the optical axis 41. Gear 3 is suitably mounted on the drive shaft of motor 1 and meshes with gear 4 which is mounted near one end of shaft 5. Mounted at the other end thereof is a gear which meshes with annular gear 7.

Annular gear 7 is mounted near one end portion of a tubular right angle prism housing carrying prism 2 at the other end portion. Directly below annular gear 7 another annular gear 9 is fixedly secured thereto having the same axis but having a reduced diameter. Annular gear 9 meshes with small gear 11 which is mounted on shaft 12. On this shaft smaller gear 13 is mounted and positioned to mesh with annular gear 14. This last gear is mounted below gears 7 and 9 and has the same axis of rotation. It is mounted on a dove prism housing 15 which retains a dove prism or erecting prism 10. When the motor is energized the gear trains have such ratios as to drive the right angle prism at twice the angular velocity as the erecting prism. The motor is also utilized to drive a mirror wheel 16 or polygon having reflecting surfaces on the peripheral surfaces in a plane parallel to its axis of rotation. Gear 21 meshes with gear 4 and is mounted on the drive shaft of a variable transmission unit 17. Drive shaft 36 from the unit culminates in a worm gear 18 which drives gear 19. The mirror wheel and gear 19 have a common shaft 20 so that the wheel is turned as gear 19 is driven. The speed of the variable transmission unit may be varied within a number of ranges as slow 37, normal 38 and fast 39. In practice the speed of the mirror-wheel is driven in an opposite direction than the right angle prism 2. The speed ratio between the mirror-wheel and the right-angle prism is such that the mirror wheel describes only the angle 40 as the right-angle prism completes a complete revolution. Positioned on the inside of circular window 23 is an adjustable azimuth scale 23A and a craft attitude scale 23B which provide the lateral and longitudinal references and is viewed by the system. Additionally another scale 44 is provided which indicates the view of the optical system, namely, rear view, left view, front view and right view. When the telescope system is employed to view a vertical panoramic plane, the scale 44 is changed to 44A to read, top and bottom. To give a view in a horizontal plane and in a vertical plane two separate systems are employed, each suitably positioned.

A light ray such as 22 passes through window 23 and is reflected downwardly by prism 2 from surface 24 into erecting prism 10 at surface 25 thereof. The ray in the prism is reflected off side 26 and out of the prism at surface 27. The ray then passes through fixedly mounted lens system 28 and is reflected at right angles by prism 29 at surface 31 and then through 30 onto a reflecting surface 32 of the mirror-wheel. Therefore it is reflected onto a screen 34 where it forms a real image. By rotating the mirror-wheel a continuous ray will seem to produce an illuminated line 33—35 on the screen. By also rotating the telescopic system and in particular the prisms 2 and 10 in the ratios discussed, it is possible to present a real image on screen 34 which corresponds to a 360° horizontal view. By synchronizing all of the rotating elements, it is possible to accomplish this without producing a double view of any part of the horizon or deficiency thereof. Also by adjusting the overall speed of the system, it is possible to repeatedly throw the 360° view onto screen 34 in a manner faster than the persistence threshold of the human eye. Therefore even though the view presented on screen 34 is being continually swept on and off across the screen the human eye as in movie projection has a degree of persistence so that the impression afforded by the screen is a continuous 360° view.

A diverging objective lens, not shown may be placed in front of and adjacent to the right-angle prism 2, to increase the angle of view on the vertical plane when the right angle prism 2 rotates on a vertical axis. It is necessary in such a case to adjust the speed ratio between the prism 2 and mirror-wheel 16.

Figure 2A:
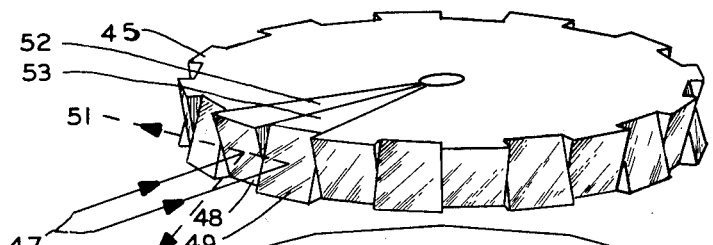
FIGURE 2A is a perspective view of the opposite angle mirror-wheel.
Figure 2B:
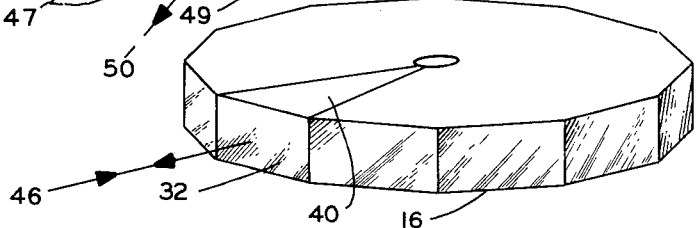
FIGURE 2B is a duplicate of a standard mirror-wheel 16 as shown in FIGURE 1.
Figure 3A:
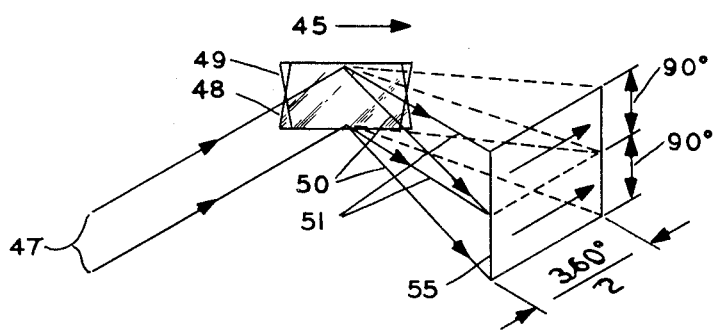
FIGURE 3A is a perspective view showing how an opposite angle three hundred and sixty degree picture is constructed on the screen by the opposite angle mirror-wheel shown in FIGURE 2A.
Figure 3B:
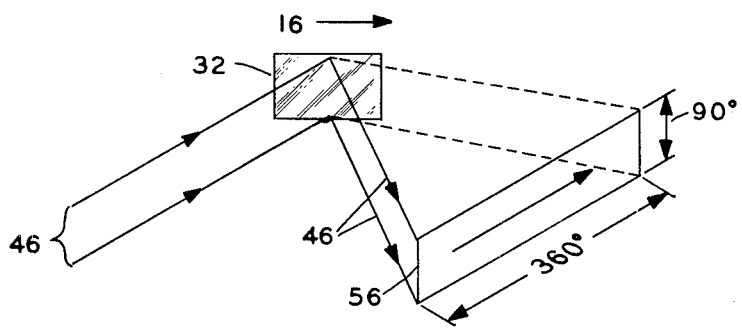
FIGURE 3B is a perspective view showing how a standard three hundred and sixty degree picture is constructed on the screen by a standard mirror-wheel shown in FIGURE 2B.

Now referring to FIGURES 2A and 2B, another embodiment 45 of the mirror-wheel 16 is shown. The polygon 45 has twice as many reflecting surfaces as polygon 16. Additionally they are at angles so that they reflect views displaced one above the other. In the mirror-wheel shown by FIGURE 2B the light ray 46 strikes surface 32 and is reflected in a plane normal with the ray of incidence. In FIGURE 2A the rays 47 strike two separate adjacent surfaces 48 and 49. Off surface 48 the ray is deflected downwardly as to 50 and off surface 49 the ray is deflected upwardly as at 51. Also the angle 40 of mirror wheel equals the sum of angles 52 and 53. In this manner the 360° view is split in half and placed one above the other. In FIGURE 3B the reflection of a 360° view represented by 46 is reflected onto a screen as a frame 56 representing the entire 360° view due to the rotation given the optical elements. The system is such that the vertical view is 90°. In FIGURE 3B surfaces 48 and 49 are shown superimposed. The views reflected are continuously displaced from the normal in sort of a rapid up and down manner. The persistence of the eye, as before, gives the impression that the 360° view has been split with one portion placed in one plane and the other in another plane one above the other.

FIGURE 4A shows a view that may be projected by the optical device when scanning a horizontal scene. Note that the view scale 44B and the azimuth scale are projected with the actual distant orthographic view 66 therebetween. FIGURE 4B shows a vertical view projected by the optical device. Note that the view scale 44AB is projected in order to identify the scenes. Additionally, the attitude scale 23BB is projected. In FIGURE 4C both images are superimposed, preferably electronically by means of a television system. A fixed dotted line 65 is employed to center the horizontal view. Additionally, a standard mask 68 is employed so that only the views desired are obtained. As an adjunct, an image of an independently adjustable craft course scale is provided which can be preset to the desired fix and followed.

Referring to FIGURES 5A and 5B numeral 69 indicates the ever central location of the peripheral motion picture camera projector in regards to opposite directions indicated by the azimuth calibrations on circle number 70. Note that by subtracting the smaller number from the larger number on the opposite side of the circle the answer will always be one hundred and eighty, numeral 68 represents a standard television mask on which the opposite angle picture consisting of four views front, right side, rear and left side is shown. Numeral 65A represents one hundred and eighty degrees of the artificial horizon image 65 and numeral 65B represents the other half of the artificial horizon image 65, numeral 23AA represents the image of the azimuth scale 23A and numeral 71 represents the image of the craft course scale.

Referring to FIGURE 6A numeral 72 indicates the horizontal peripheral motion picture camera projector that feeds continuous three hundred and sixty degree motion picture scenes to a television camera 73. Also fed into this same television camera 73 is the continuous image of the artificial horizon 64 and the independent craft course scale 71A. These three images are superimposed and fed into the television control unit 74 as electronic impulses from where they may be directed to a television monitor 75 and a television transmitter 76 and to a television antenna 77. The opposite direction control 45A, the lateral picture control 17A and the independent craft course scale 71A are located at the television monitor 75 where they are operated by the viewer.

Referring to FIGURE 6B a vertical peripheral motion picture camera projector 78 and a horizontal peripheral motion picture camera projector 72 are synchronized so that together the two cameras can sweep two three hundred and sixty degree orbits on two ninety degree planes simultaneously and their continuous motion pictures are superimposed to provide the six necessary views to form an orthographic picture of cubical vision on a television viewing screen simultaneously in the following manner: The horizontal peripheral motion picture camera projector 72 projects continuous ninety degree by ninety degree views of the front, right side, rear and left side, to the television camera 73. Which converts the light impulses into electronic impulses which are fed into the television control unit 74. At the very same time the vertical motion picture camera projector 78 projects continuous ninety degree by ninety degree views of the top and bottom scenes to the television camera 79. The other two views the front and rear taken by the vertical peripheral motion picture camera projector 78 are blanked out so as not to be superimposed on the front and rear views taken by the horizontal peripheral motion picture camera projector 72. The light impulses of the top and bottom views are converted into electronic impulses which go into the television control unit 74. The television control unit 74 mixes these electronic impulses in the conventional manner and relays them to the television transmitter 76 which transmits the combined pictures, as one cubical vision picture having six ninety degree by ninety degree orthographic views presented on the television viewing screen of the television monitor 75 which may also be transmitted over the air through the television antenna 77. An artificial horizon gyro 64, a craft course scale gyro 71A, a lateral picture control 17A and a vertical picture control 17B are included in this arrangement for navigating and/or for remote control purposes. The craft course gyro 71A and the artificial horizon gyro 64 are connected with the television camera 73 so that the image of the artificial horizon 65 and the image of the craft course scale 71 are always in view of the operator so he may always know the attitude and course of the craft, the lateral picture control 17A and the vertical picture control 17B are used in conjunction with the craft course gyro 71A and the artificial horizon gyro 64 and for celestial navigation as a pictorial sextant.

The cubical vision picture is divided into six views so the viewer's brain responds conventionally to what the viewer's eyes see. The attitude of the craft in relation to the six directions is always indicated on the television screen by the image of the artificial horizon 65 and the image of the craft course scale 71 both of which are superimposed over the six orthographic views, these two features when added to the cubical vision system make it into a pictorial navigating system that is essential for a perfect remote control system.

Since a laboratory structure has been described, and only the major modifications have been included, primarily to illustrate the principles of my invention, I feel justified in saying that a broad field is being opened with the issue of this patent and many more modifications are possible therefore the scope of this invention is limited only by the appended claims.

I claim:

1. A panoramic projector system comprising a real image producing telescope means, said telescope including a first rotatable 45° reflecting means adapted to reflect a panoramic view into a rotatable erecting prism, said prism adapted to rotate in the same direction as said first reflecting means and at an angular velocity of one-half of the angular velocity of the first reflecting means, a fixed second 45° reflecting means adapted to reflect said view through an objective lens, an oppositely rotatable polygon having reflecting surfaces on the periphery thereof in a plane parallel to the axis of rotation of said polygon, the polygon positioned to receive the real image and to reflect said image onto a screen, said polygon adapted to rotate at an angular velocity equal to the angle between two radial coplanar lines, each perpendicular to the said axis of rotation of the polygon, drawn from the said axis to the ends of one reflecting surface of the said polygon which are parallel to the axis of rotation of the polygon.

2. The system of claim 1 wherein the polygon reflecting surfaces are equally divided into oppositely inclined surfaces whereby the real image reflected is divided and positioned on a screen one above the other.

3. The system of claim 1 wherein the real image is reflected from the polygonal surfaces onto a television scanning camera.

References Cited in the file of this patent

UNITED STATES PATENTS

| Re. 20,523 | Stout | Sept. 28, 1937 |
| 815,657 | Swasey | Mar. 20, 1906 |
| 1,660,886 | Randall | Feb. 28, 1928 |
| 2,314,960 | Willard | Mar. 30, 1943 |
| 2,632,801 | Donaldson | Mar. 24, 1953 |